J. W. BRADY.
Coffee Cleaner.

No. 100,492. Patented March 8, 1870.

WITNESSES
Chas. A. Harkness.
J. S. Brown.

INVENTOR
J. W. Brady
By Farwell, Celesurater & Co
Attorneys

United States Patent Office.

JAMES W. BRADY, OF CATONSVILLE, MARYLAND, ASSIGNOR TO M. W. BRADY, OF SAME PLACE.

Letters Patent No. 100,492, dated March 8, 1870.

---

IMPROVEMENT IN COFFEE-CLEANING MACHINES.

---

The Schedule referred to in these Letters Patent and making part of the same.

---

*To all whom it may concern:*

Be it known that I, JAMES W. BRADY, of Catonsville, in the county of Baltimore, and State of Maryland, have invented a new and improved Coffee-Cleaning Machine; and I do hereby declare the following to be a full, clear, and exact description thereof, which will enable others skilled in the art to make and use the same, reference being had to the accompanying drawings forming part of this specification, in which—

Figure 1:
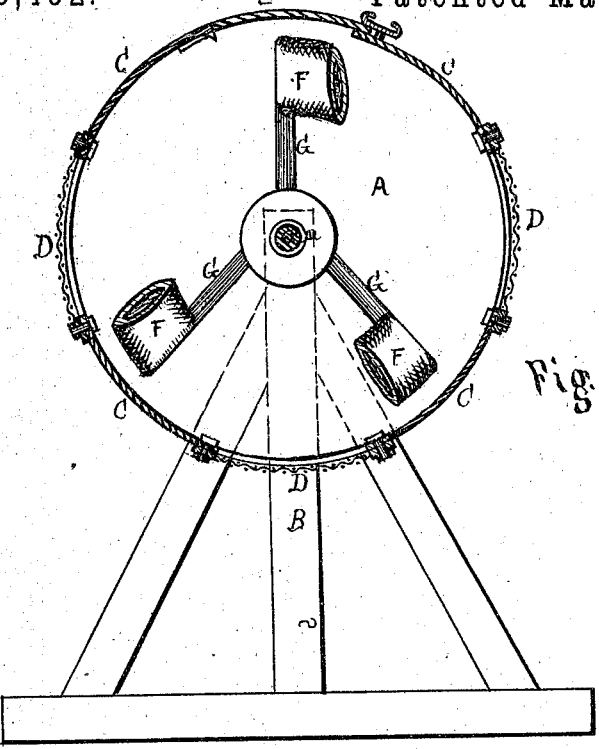

Figure 1 is a transverse vertical section of my improved machine, and

Figure 2:
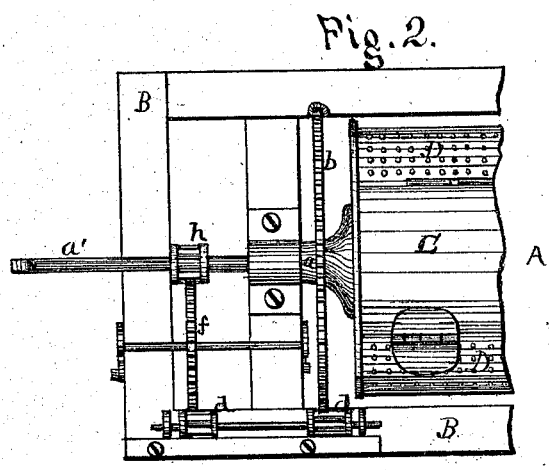

Figure 2, a detached plan view of the same, showing a method of rotating the cylinder and stirrers.

Similar letters of reference indicate corresponding parts in the several figures of the drawings.

My invention has for its object to improve the construction of machines for cleaning coffee, in order to render them more efficient in their operation.

In the accompanying drawings—

The cylinder A is shown mounted upon hollow journals $a$, revolving in suitable bearings in a frame, B.

The cylinder is formed of sections C, of sheet metal, alternating with wire-gauze or perforated metal screens D, secured to the sections C by any suitable fastenings. I prefer to employ screws and nuts for this purpose, to allow the screens to be removed or replaced by others of varying fineness, according to the work to be done.

The coffee is supplied to or removed from the cylinder by a door, E, having suitable fastenings to prevent its accidental opening.

If desired, plates of wood may be substituted for the metal sections C, or the latter may be lined with wood, leather, raw hide, or equivalent polishing material.

$a'$ is a shaft extending longitudinally through the cylinder, and having its bearings in the hollow journals of the latter and the frame B.

F are spiral wings or stirrers, mounted upon the shaft $a'$ by means of the radial arms G, so that the circle described by the rotation of said wings shall be near the inner circumference of the cylinder.

The operation is as follows:

The desired quantity of coffee to be cleaned is placed in the cylinder, the door closed, and the cylinder revolved at the desired rate of speed by power applied in any proper manner.

The spiral wings or stirrers are rotated in a direction opposite the rotation of the cylinder by any suitable means, and lift the coffee successively from end to end of the cylinder.

By this arrangement the coffee is rubbed over the metallic surfaces or polishing-surfaces, lifted and tumbled by the stirrers, and sifted by the screens, thus thoroughly cleaning and polishing it.

I have shown one method by which the wings and cylinder may be rotated in opposite directions, but it is obvious that other arrangements would answer equally well.

In this example the cylinder is mounted loosely upon the shaft $a'$, and is provided with an exterior gear-wheel, B, which meshes into one of the wheels $d$ mounted upon a shaft, having its bearings in the frame B, as shown.

The second wheel $d$ engages with a gear-wheel, $f$, also mounted upon the frame B, and which meshes into a wheel, $h$, mounted upon the shaft $a'$.

By this arrangement of gearing it will readily be seen that opposite rotation of the cylinder and wings is effected.

Having thus described my invention,

What I claim as new, and desire to secure by Letters Patent, is—

The spiral wings or stirrers F, in combination with the cylinder A, composed of alternate sections of imperforate metal or wood and sections of wire-cloth or perforated metal, the cylinder and stirrers revolving in opposite directions, substantially as described for the purpose specified.

J. W. BRADY.

Witnesses:
CHAS. A. HARKNESS,
E. P. ELLSWORTH.